10

United States Patent Office 3,181,978
Patented May 4, 1965

3,181,978
PROCESS FOR RESTORING DUCTILITY TO HYDROGEN ATTACKED STEEL
Lazarus C. Weiner, Great Neck, N.Y., assignor to Esso Research and Engineering Company, a corporation of Delaware
No Drawing. Continuation of application Ser. No. 19,199, Apr. 1, 1960. This application Mar. 25, 1963, Ser. No. 267,806
3 Claims. (Cl. 148—14)

This invention relates to a process for restoring ductility to steels which have been embrittled by exposure to an atmosphere which consists at least in part of hydrogen gas. The present case is a continuation of S.N. 19,199, now abandoned, filed April 1, 1960.

A number of industrial processes, particularly processes employed in the petroleum industry, cause exposure of ferrous metal structures to atmospheres consisting at least in part of hydrogen gas. Examples of such processes include catalytic reforming of virgin naphthas and hydrodesulfurization of naphthas and other hydrocarbon materials such as heating oils, lubricating oils, kerosenes, etc. Particular structural elements subject to hydrogen gas exposure in these atmospheres include furnace and other heat exchanger tubes, piping, reactor vessels, valves, etc.

In catalytic reforming, reactor vessels will contain gases in the temperature range of 900°–1100° F. having partial pressures of hydrogen in the range of about 150–350 p.s.i. In hydrodesulfurization, reactor vessels will contain gases in the temperature range of about 550°–800° F. having partial pressures of hydrogen in the range of about 100–250 p.s.i. In either process an insulating refractory liner may reduce the temperature at the reactor vessel inner surface by about 100° F., but, importantly for the present invention, hydrogen will diffuse through the liner material and in fact be in contact with the metal structure of the vessel.

A possible deleterious effect of hydrogen gas upon ferrous metals such as are needed to contain gases exerting pressures of the order of magnitude indicated above is that of embrittlement or loss of ductility of a heretofore-considered permanent or irreversible nature. This type of embrittlement is known as "hydrogen attack" and is the type with which the present invention is particularly concerned. It is to be distinguished from the known temporary or reversible embrittlement of ferrous metals which may be observed in them after exposure at low temperatures and low pressures to hydrogen in aqueous solution. Ductility may be restored in this latter case by baking the embrittled metals at relatively low temperatures up to about 400° F. to drive residual hydrogen out of them.

For a discussion of the so-called "irreversible" embrittlement of ferrous metals due to exposure to hydrogen gas, that is, hydrogen attack, reference may be had to the article "Blistering and Embrittlement of Pressure Vessel Steels by Hydrogen" by G. A. Nelson and R. T. Effinger appearing at pp. 12f–21f of the Welding Journal, vol. XXXIV, 1955. In general, it may be said that the embrittling effect of hydrogen is increased for any given ferrous material with which it is in contact with increasing gas temperature and partial pressure of hydrogen therein.

To avoid or at least delay the start of "irreversible" embrittlement of reactor vessels and other pressure-resisting structures which may be exposed to atmospheres containing hydrogen, it has been frequently necessary to specify steels having at least small percentages of alloying elements for the fabrication of these structures. An example of alloy steels so used is one designated A387 by the American Society for Testing Materials (A.S.T.M.). In its grades B and C, this steel contains about 1¼% chromium and ½% molybdenum. In its grade D, it contains about 2¼% chromium and about 1% molybdenum.

Alloy steels are, as a rule, more expensive than plain carbon steels. Accordingly when a structure must be or at least is specified to be fabricated of alloy steel as a protection against hydrogen attack, and assuming that alloy steel is specified for no other reason, the initial cost of the structure will be increased over what it would be were carbon steel not susceptible to "irreversible" embrittlement by such attack.

According to the present invention it has been found that the embrittling effect of high temperature atmospheres having high partial pressures of hydrogen gas upon carbon steels is not in fact irreversible, and that even after prolonged exposure to such atmospheres these steels can have their ductility restored by heating at temperatures either above or at least somewhat below the lower critical temperature of about 1333° F. for steel.

The present invention, therefore, makes it possible to fabricate a pressure-resisting element such as a furnace tube out of plain carbon steel; use this tube in or to contain a high temperature atmosphere having a high partial pressure of hydrogen gas and allow it to sustain some embrittlement from hydrogen attack; remove the tube from service to restore its ductility, and thereafter return it to service for further exposure to an atmosphere of the kind described. In many cases it may be economical to fabricate parts subject to hydrogen attack of plain carbon steels and restore their ductility from time to time by the process of this invention instead of fabricating these parts of alloy steels.

For purposes of the present invention, plain carbon steel may be considered as being a pure alloy of iron and carbon. It may be graded according to the amount of carbon it contains, the following terms being fairly commonly used.

| Grade: | Carbon content, percent |
|---|---|
| Very low carbon steel, very mild, or extra mild steel, very soft or dead soft steel | Not over 0.10. |
| Low carbon steel, mild steel, soft steel | Not over 0.25. |
| Medium soft steel | 0.25 to 0.40. |
| Medium high carbon steel, half hard steel | 0.40 to 0.60. |
| High carbon steel, hard steel | Over 0.60. |
| Very high carbon steel, very hard, or extra hard steel | Over 1.00. |

It is to be understood, of course, that a steel in commerce may properly be considered a plain carbon steel as it is free of alloying elements such as chromium, molybdenum, etc., although it does contain at least traces of elements such as silicon, phosphorus, sulfur, etc., these latter elements being considered impurities.

Embrittlement or loss of ductility in a particular steel may be detected by a decrease in the percent reduction in cross section area of a tensile test specimen of the material in question which is stressed to rupture. Experiments to determine such loss of ductility due to exposure to a hydrogen atmosphere have been conducted on a plain carbon steel corresponding essentially to the designation of an A.S.T.M. A201 steel. This steel had a carbon content of about 0.20% and its microstructure was normally pearlitic; that is, it was non-spheroidized.

A batch of tensile test specimens of the sample material were exposed for about 70 hours to a gaseous atmosphere having a temperature of about 1000° F. and a partial pressure of hydrogen of about 700 p.s.i. These specimens were miniatures having the following dimensions:

|  | Inches |
|---|---|
| Total length | 2 |
| Gauge length | ½ |
| End diameter at threaded portions | 3/16 |
| Central diameter in gauge length | 0.090 |

Tensile test specimens of the sample material strained to rupture without prior exposure to a hydrogen atmosphere showed, on the average, a reduction in cross section area of about 70% at the point of breakage. In comparison with this, specimens tested to rupture after hydrogen exposure for the time and conditions of temperature and pressure stated above and subsequent essentially furnace cooling to room temperature showed only about 13% reduction in area, or about an 81.5% decrease in percent reduction in area from the non-exposed specimen when tested to rupture. Such loss of ductility indicated an advanced stage of hydrogen attack, representing as it did an essentially brittle failure.

Lots of additional tensile test specimens from the batch exposed to a hydrogen atmosphere for the time and conditions of temperature and pressure stated above were then reheated to various temperatures from about 1250° F. to about 1650° F.; maintained at these temperatures for periods of time from about ½ hr. to about 25 hrs.; essentially furnace cooled to room temperature, and thereafter stressed to rupture and their percent reductions in cross section area determined. The reheating was done in an atmosphere of hydrogen having a slight positive pressure, about 10–20 p.s.i. The purpose of the hydrogen was simply that of excluding air to prevent oxidation of the reheated steel.

Substantial recoveries in percent reduction in cross section area were noted for all values of reheating temperature from about 1250° F. upward. Times at the various temperatures did not appear to be significant factors in the recoveries; that is, for a given reheat temperature no difference in recovery was observed with temperature maintenance times of ½ hr., 1 hr., and 25 hrs., within the limits of experimental accuracy. Accordingly, the values of percent Loss of Original Ductility (Percent Hydrogen Attack) and Percent Ductility Recovered given below are not only average values with respect to time but also essentially constant values for all values of reheating time at least as great as about ½ hr. In tabular form, therefore, the results of reheating, furnace cooling and subsequent stressing to rupture in tension were as follows:

| Reheating Temp. (° F.) (maintained at least ½ hr.) | Percent Loss of Original Ductility (Percent Hydrogen Attack) | Percent Ductility Recovered |
|---|---|---|
| 1,250 | 81.5 | 13.5 |
| 1,450 | 70.5 | 57.0 |
| 1,550 | 35.1 | 71.7 |
| 1,650 | 23.1 | 90.0 |
|  | 8.4 |  |

The above-noted values of Percent Ductility Recovered will lie along an essentially straight line when plotted against Reheating Temperature on regular coordinates. This indicates that recoveries even greater than 90% might have been obtained at temperature above 1650° F. Extrapolation of such a graph indicates that a minimum loss of Original Ductility occurs about 1750° F. It is significant that at least some recovery, 13.5%, was obtained at a reheating temperature of about 1250° F. which is below the lower critical temperature for steel of about 1333° F. This demonstrates conclusively that recovery of ductility of hydrogen attacked steels by reheating them according to the present invention is not related to the establishment of a new set of grain boundaries in the attacked and subsequently reheated material.

Further evidence that restoration of ductility is not contingent upon the establishment of a new set of grain boundaries has been supplied by experiments which have shown that once a hydrogen attacked steel has been plastically deformed, its ductility cannot be restored by heating above the lower critical temperature, not even by heating to a temperature as high as about 1650° F.

Referring to the tabular data just given, the reheating temperature for restoration of ductility of unstrained or undeformed tensile test specimens was, in each case, above that at which methane gas in the grain boundaries of the steel dissociated or cracked into hydrogen and carbon. In a particular case, this dissociation or cracking is dependent upon both temperature and menthane/hydrogen concentration. Graphic data for the equilibrium of hydrogen and steel may be obtained by reference to a set of curves entitled "Equilibra for Gas-Steel Reactions" appearing on p. 65 of the publication Metal Progress, vol. 63, 1946.

It may be concluded that restoration of ductility of hydrogen attacked steels through reheating is due directly to the dissociation of methane in grain boundaries which have not as yet been ruptured by excess pressure of methane, but at which this gas pressure still acts as a stress concentrator in the attacked material.

Any steel, plain carbon or alloy, which has been hydrogen attacked but not plastically deformed may be reheated to effect a substantially full restoration of its ductility, and thereafter be reemployed for at least a while as a structural material in a high temperature, high pressure atmosphere of hydrogen according to the present invention. This invention is concerned principally, however, with such restoration of ductility in plain carbon steels having a carbon content of about 0.10 to 1.0% or higher which have heretofore not been considered suitable at all as structural materials for use in or to contain high temperature atmospheres having high partial pressures of hydrogen gas because of the belief that these steels would indeed suffer a truly irreversible embrittlement upon continued exposure to such atmospheres.

To those skilled in the relevant art, it will be obvious that numerous variations may be made in the materials and their treatment and end uses particularly described in the specification without departing from the spirit and scope of the present invention. This will be true especially with regard to numerical quantities recited herein. It is intended to cover all these variations in the following claims to the full extent that the prior art permits.

What is claimed is:

1. A process for restoring over 13.5% of the original ductillity to plain carbon steels of at least 0.10% carbon content containing methane generated by reaction between the carbon of said steel and a hydrogen environment at high temperature and high hydrogen partial pressure, the amount of methane being in the range between that which causes "irreversible" embrittlement typical of conditions of such carbon steel after along exposure to a hydrogen partial pressure of the order of at least 100 pounds per square inch and at a temperature of at least 550° F. and that which causes plastic deformation of the steel comprising heating said methane embrittled steel to a temperature over 1250° F. for a period exceeding ½ hour.

2. The process of claim 1 wherein the said steel is heated in an atmosphere of hydrogen having a pressure of about 10 to 20 p.s.i.

3. The process of claim 1 wherein the said steel is a plain carbon steel having a carbon content of at least about 0.20%.

References Cited by the Examiner
UNITED STATES PATENTS 2,279,716  4/42  Nieman _____ 148—134

OTHER REFERENCES

"New Technique Rids Plated Steel of Hydrogen Embrittlement," by H. H. Johnson et al.; reprinted from The Iron Age, July 31, 1958 (4 pages); Case Institute of Technology Reprint No. 1321.

The Making, Shaping and Treating of Steel, published by The United States Steel Corp. (7th ed., 1957), page 414 relied on.

DAVID L. RECK, *Primary Examiner.*